(12) United States Patent
Komichi

(10) Patent No.: US 8,345,058 B2
(45) Date of Patent: Jan. 1, 2013

(54) GRAPHICS DISPLAY DEVICE AND GRAPHICS DISPLAY METHOD

(75) Inventor: Takeo Komichi, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 587 days.

(21) Appl. No.: 12/615,584

(22) Filed: Nov. 10, 2009

(65) Prior Publication Data

US 2010/0156923 A1      Jun. 24, 2010

(30) Foreign Application Priority Data

Dec. 24, 2008   (JP) .................. 2008-326800

(51) Int. Cl.
*G09G 5/00* (2006.01)
*G09G 5/10* (2006.01)
*G06T 1/00* (2006.01)
*G06F 13/372* (2006.01)
*G06F 12/00* (2006.01)
*G06F 17/00* (2006.01)
*G06F 3/00* (2006.01)
*G06F 3/048* (2006.01)

(52) U.S. Cl. ........ 345/581; 345/204; 345/418; 345/501; 345/534; 345/691; 711/100; 715/211; 715/273; 715/700; 715/856

(58) Field of Classification Search .............. 345/418, 345/581, 619, 156, 160, 501, 520, 530–531, 345/534–538, 548, 204, 690, 691, 694; 711/100; 715/200, 211, 273, 275, 700, 722, 764, 856, 715/961, 964
See application file for complete search history.

(56) References Cited

U.S. PATENT DOCUMENTS

| | | | |
|---|---|---|---|
| 2002/0097436 A1* | 7/2002 | Yokoyama et al. | 358/2.1 |
| 2006/0097995 A1* | 5/2006 | Nagayasu | 345/173 |
| 2007/0152992 A1 | 7/2007 | Kohda et al. | |

FOREIGN PATENT DOCUMENTS

| | | |
|---|---|---|
| JP | 01-169487 | 7/1989 |
| JP | 2001-265581 | 9/2001 |
| JP | 2002-278526 | 9/2002 |

OTHER PUBLICATIONS

Japanese Office Action issued Jul. 10, 2012 in corresponding Japanese Patent Application No. 2008-326800.

* cited by examiner

*Primary Examiner* — Wesner Sajous

(74) *Attorney, Agent, or Firm* — Staas & Halsey LLP

(57) ABSTRACT

A graphics display device and method performing display indicating that graphics software for graphics drawing is an evaluation version including storing a display pattern indicating that the graphics software is an evaluation version, storing a parameter indicating a display method of the display pattern and displaying the display pattern based on the parameter by a cursor display hardware.

14 Claims, 14 Drawing Sheets

FIG. 6

| OFFSET ADDRESS | 31..0 (BIT POSITION) |
|---|---|
| 0x0A0 | CURSOR DISPLAY ON (CPM_CUTC) |
| 0x0A4 | CURSOR NUMBER 0 ADDRESS (CU0A0) |
| 0x0A8 | CURSOR NUMBER 0 COORDINATES (CUY0_CUX0) |
| 0x0AC | CURSOR NUMBER 1 ADDRESS (CU0A1) |
| 0x0B0 | CURSOR NUMBER 1 COORDINATES (CUY1_CUX1) |
| 0x180 | CURSOR LAYER ENABLE (DLS) |
| 0x400 | CURSOR LAYER PALETTE NUMBER 0 (LOPAL0) |
| 0x404 | CURSOR LAYER PALETTE NUMBER 1 (LOPAL1) |
| 0x408 | CURSOR LAYER PALETTE NUMBER 2 (LOPAL2) |
| 0x40C | CURSOR LAYER PALETTE NUMBER 3 (LOPAL3) |
| 0x410 | CURSOR LAYER PALETTE NUMBER 4 (LOPAL4) |
| 0x414 | CURSOR LAYER PALETTE NUMBER 5 (LOPAL5) |
| 0x418 | CURSOR LAYER PALETTE NUMBER 6 (LOPAL6) |
| 0x41C | CURSOR LAYER PALETTE NUMBER 7 (LOPAL7) |

GRAPHICS DISPLAY DEVICE AND GRAPHICS DISPLAY METHOD

CROSS-REFERENCE TO RELATED APPLICATIONS

This application claims the benefit of priority from Japanese Patent Application No. 2008-326800 filed on Dec. 24, 2008, the entire contents of which are incorporated herein by reference.

BACKGROUND

1. Field

Embodiments discussed herein relate to graphics display device and graphics display method.

2. Description of the Related Art

A functional restriction is imposed to differentiate between evaluation version graphics software and production version graphics software. Moreover, since no measures are taken to prevent unauthorized use of a binary file of the evaluation version graphics software, the evaluation version graphics software may be illegally installed on a product.

Related technologies are discussed in Japanese Laid-open Patent Publication No. 2001-265581 and Japanese Laid-open Patent Publication No. H1-169487.

SUMMARY

According to one aspect of an embodiment, a graphics display device performing display indicating that graphics software for graphics drawing is an evaluation version is provides. The graphics display device includes: a storage circuit that stores a display pattern indicating that the graphics software is an evaluation version; a display register that stores a parameter indicating a display method of the display pattern; and a display circuit that displays the display pattern based on the parameter by a cursor display hardware.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 illustrates an exemplary register name of a display register.

DETAILED DESCRIPTION OF EMBODIMENTS

Figure 1:
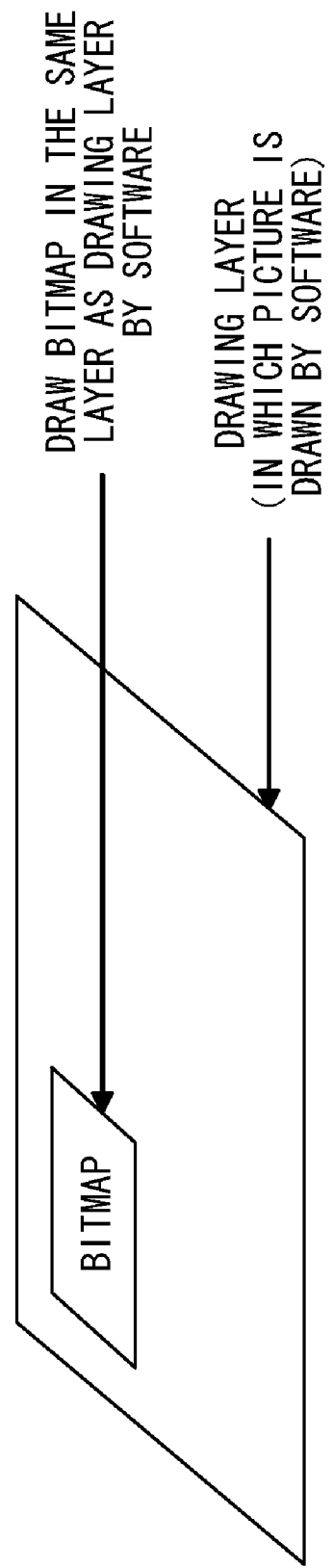
FIG. 1 illustrates an exemplary drawing processing.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates an exemplary drawing processing. In a drawing layer on which drawing software implements a drawing operation, a bitmap indicating that a graphics software is an evaluation version is drawn. Drawing means expanding image data in a display memory. Display means projecting an image on a display screen. The bitmap is written into the display memory so as to be written over the drawing image data. Therefore, the drawn data drawn by the drawing software may be changed on the display memory.

Figure 2:
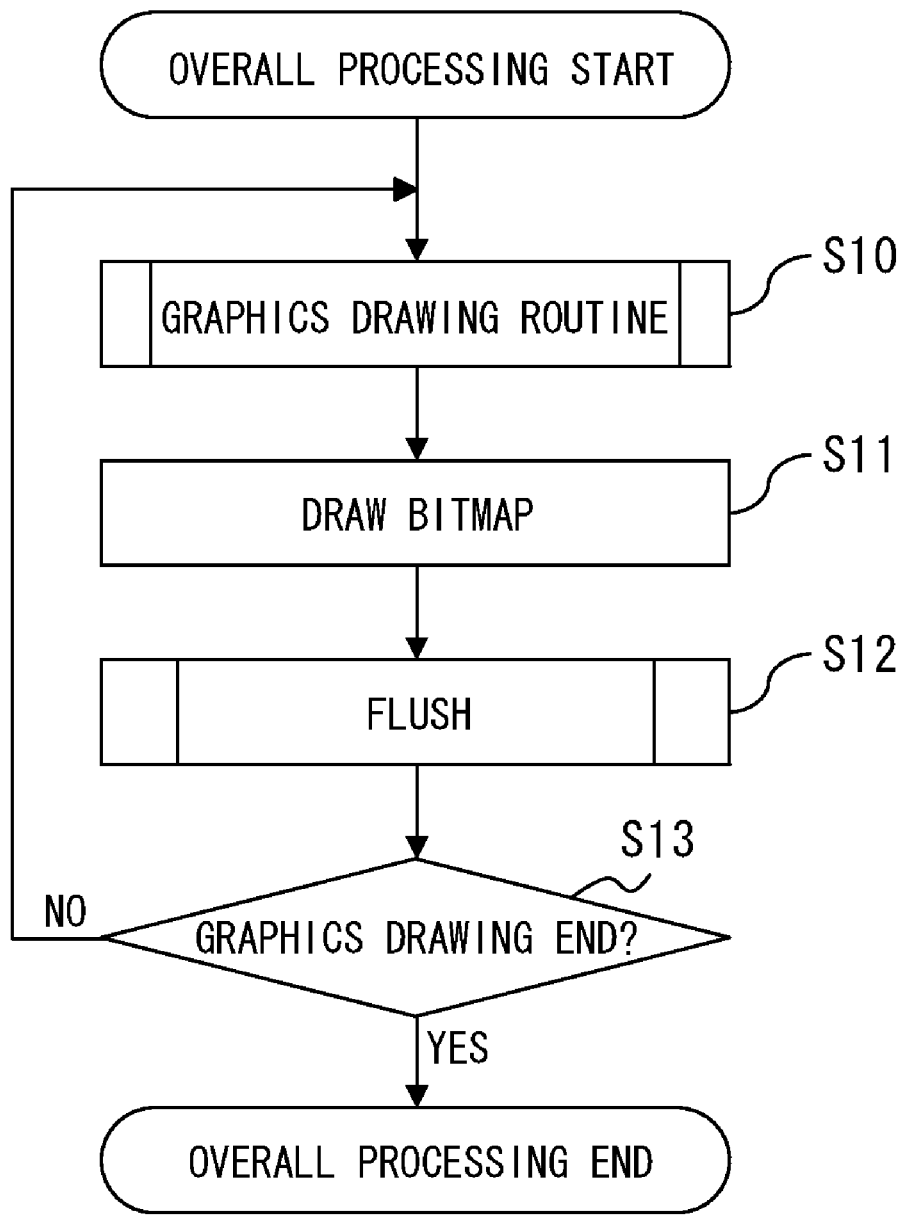
FIG. 2 illustrates another exemplary drawing processing.

FIG. 2 illustrates another exemplary drawing processing. In operation S10, a graphics drawing routine is called, and a graphics draw command is generated. In operation S11, a bitmap indicating that graphics software is an evaluation version is drawn. A draw command for drawing the bitmap is generated. In operation S12, a drawing flush function is called, and drawing is performed by the generated draw command. In operation S13, the drawing process determines whether graphics drawing has reached an end. When determined at operation S13 that the graphics drawing has ended, overall processing ends. On the other hand, when determining at operation S13 that the graphics drawing has not ended, the drawing process returns to operation S10. While a flush processing is illustrated herein, any type of display that is independent of differences across various software may be used.

Figure 3:
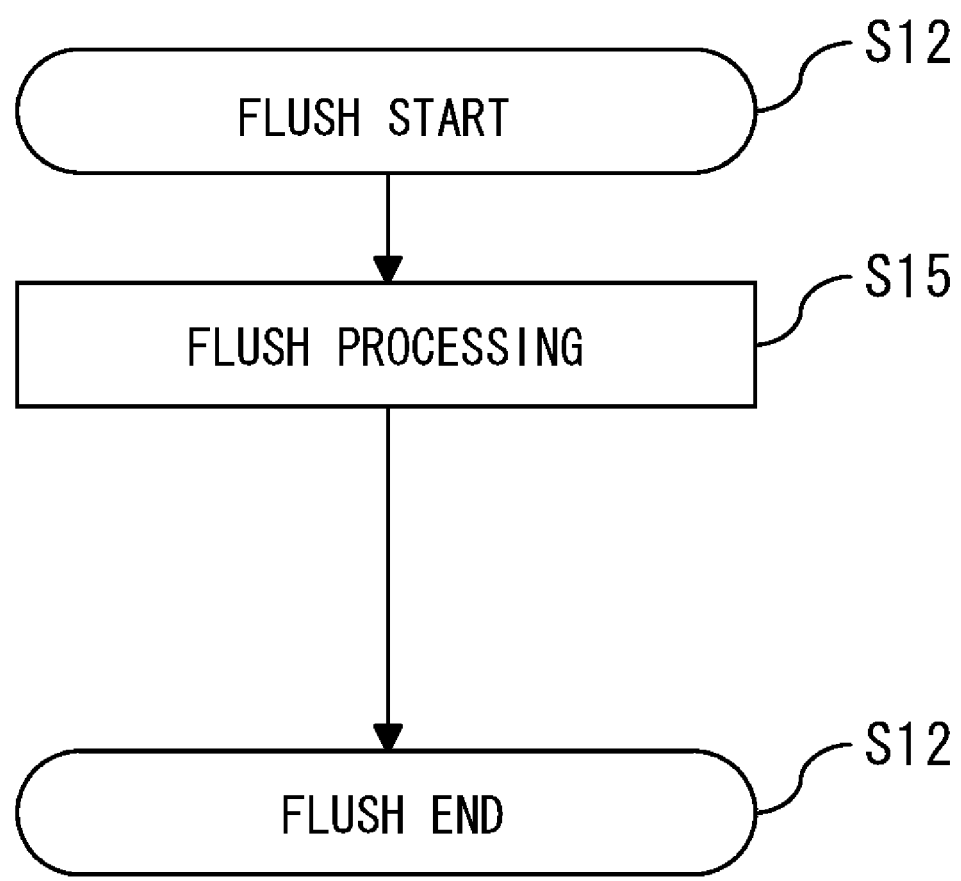
FIG. 3 illustrates another exemplary drawing processing.

FIG. 3 illustrates another exemplary drawing processing. The drawing flush function in operation S12, which performs a drawing flush processing in operation S15, is called from a user application, for example. With the drawing flush function, drawing of a graphic is started.

Figure 4:
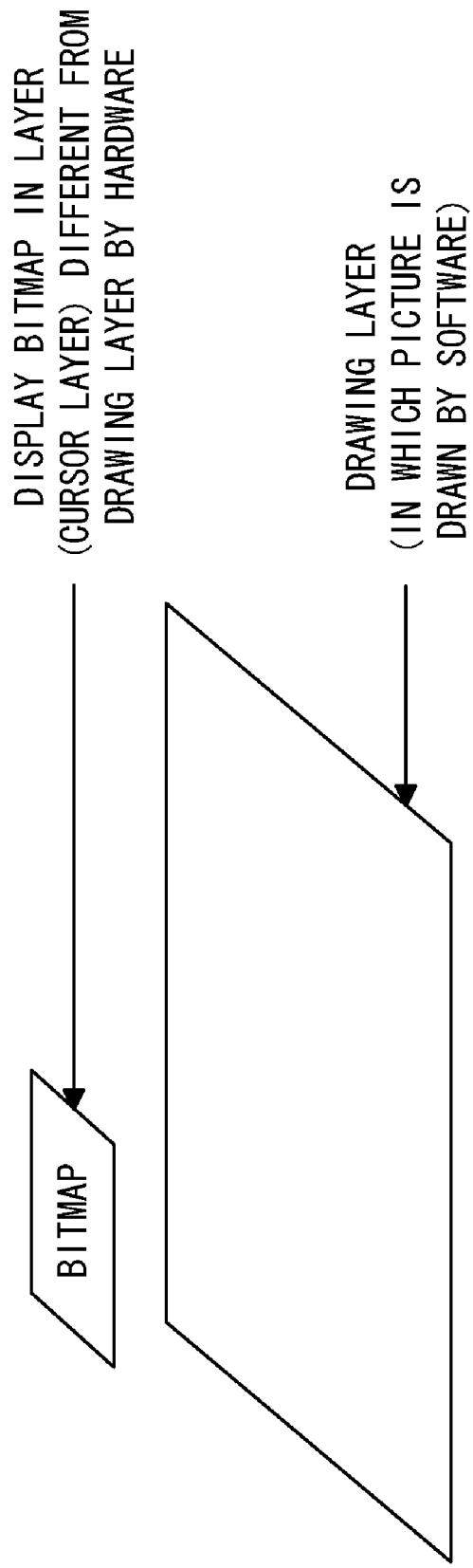
FIG. 4 illustrates an embodiment.

FIG. 4 shows an embodiment. In a cursor layer which is different from a drawing layer in which a picture is drawn by software and is related to cursor display processing, a bitmap indicating that graphics software is an evaluation version is displayed by using hardware. The bitmap is displayed by the function of displaying a cursor, for example, the display function of the hardware.

The bitmap indicating that graphics software is an evaluation version is set to cursor numbers 0 and 1. Two cursors are displayed, and the cursors are identified by the cursor numbers 0 and 1. Cursor display is performed by hardware, for example, a Graphics Display Controller (GDC). Since cursor display is performed independently of an operation of the software, the cursor display does not affect the drawing function and performance of the software. A cursor pattern is placed in a VRAM. Display of a bitmap indicating that graphics software is an evaluation version may be performed at regular intervals at which the drawing flush function is called. For example, suppose that the drawing flush function is called once every 100 times. Then, the bitmap is displayed with timing 0, 100, 200, . . . By checking a display register, it is checked whether the user inserts illegal avoidance processing or not. If the display register is found to be changed, a value is set again.

For example, the drawing flush function includes eglSwapBuffers, glFlush, or glFinish.

For example, the drawing flush function eglSwapBuffers is as follows.

Format: EGLBoolean eglSwapBuffers (EGLDisplay display, EGLSurface surface);
Arguments: display EGLDisplay is specified; and surface EGL window surface is specified.
Explanation: Back buffer is exchanged for Front buffer.
Supplement: EGL is an interface between OpenGL ES and a window system provided by the underlying native platform. OpenGL ES (OpenGL for Embedded Systems) is a subset graphics library of embedded OpenGL.

For example, the drawing flush function glFlush is as follows.
Format: void glFlush(void);
Explanation: execution of previously issued OpenGL ES commands is forcefully started. It is ensured that these commands are completed in a finite time.

The drawing flush function glFinish is as follows.
Format: void glFinish(void);
Explanation: all of the issued OpenGL ES commands are forcefully completed. This function does not return until execution of all the issued commands is completed.

By turning cursor display Off, setting coordinates outside the screen, or setting a palette, for example, setting a display color of the cursor to a transparent color by an application, protection may be removed. Therefore, the following values are set again. A name in parentheses represents a register name of a GDC.

Cursor number 0, 1 address (CUOA0, CUOA1)
Cursor number 0, 1 coordinates (CUY0_CUX0, CUY1_CUX1)
Cursor layer palette (L0PAL0 to L0PAL7), for example, eight colors
Cursor layer enable (DLS)
Cursor pattern is copied from a main memory to a VRAM—cursor display On (CPM_CUTC)

Since a bitmap indicating (marking) that graphics software is an evaluation version is displayed by hardware, the effects on the drawing performance of the software are minimized. By using an evaluation version, assessment that is substantially equal to a production version may be performed. As such, data indicating that the software is an evaluation version is embedded in a display of a graphics or other data.

Even in a case when evaluation version graphics software is illegally installed on a product, it is evident that the software is an evaluation version. This helps prevent unauthorized use of the software, and this may encourage an unauthorized user to purchase production version graphics software.

Figure 5:
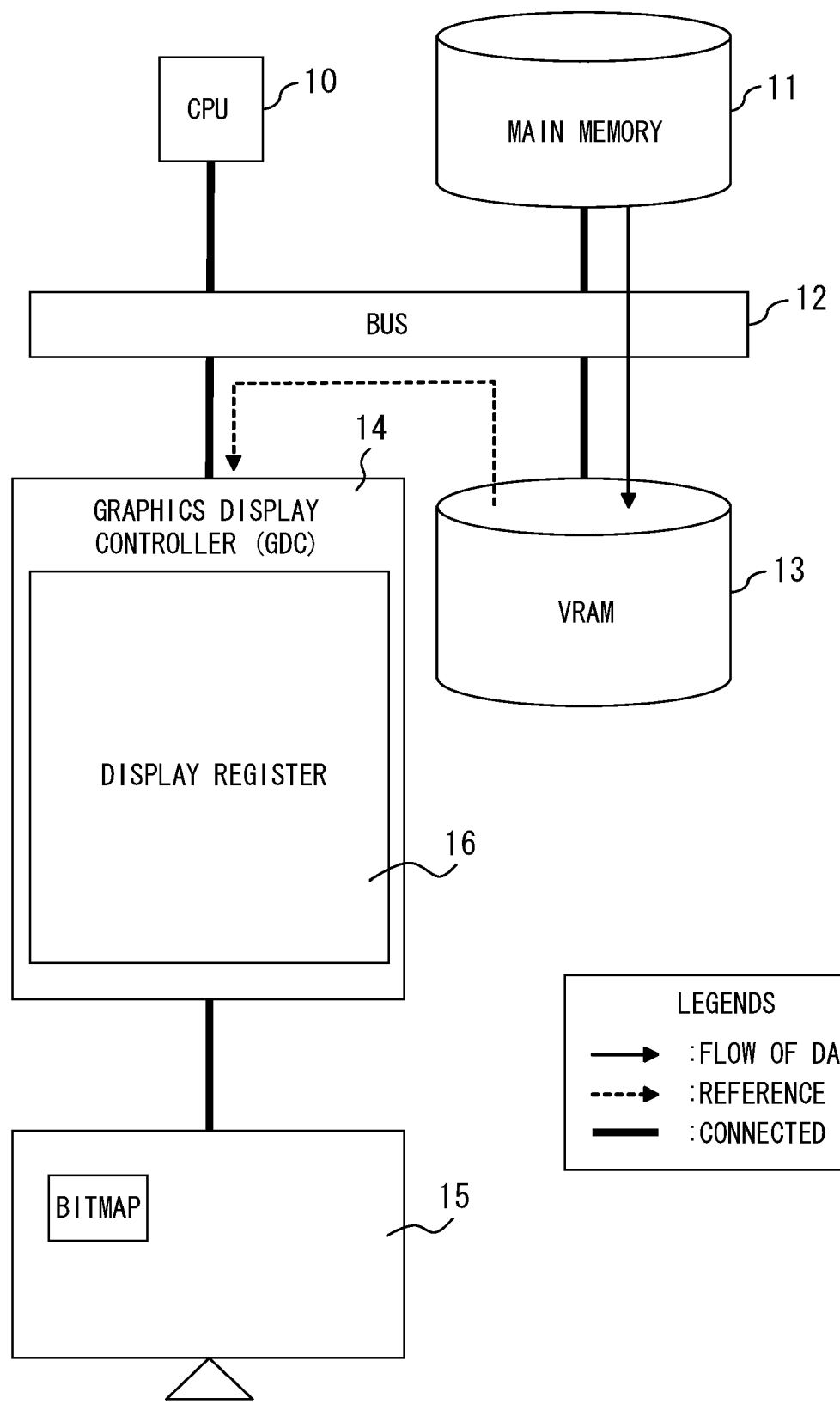
FIG. 5 illustrates an exemplary graphics display device.

In an embodiment, an unauthorized use is visually confirmed by cursor display. FIG. 5 illustrates an exemplary graphics display device.

A CPU 10 is coupled to a main memory 11, a VRAM 13, a GDC 14, and a bus 12. The main memory 11 stores a cursor original pattern including a pattern of a bitmap indicating that graphics software is an evaluation version. The VRAM 13 stores a hardware display cursor pattern and a drawing layer. The original cursor pattern of the main memory 11 is copied to the VRAM 13 at regular intervals. The GDC 14 refers to the cursor pattern and the drawing layer stored in the VRAM 13, and displays the cursor pattern and the drawing layer. The GDC 14 reads the cursor pattern, and displays the cursor pattern by a processing circuit built into the GDC 14. Display by hardware is performed based on data written into a display register 16. In the display register 16, information such as a cursor address (CUOA0, CUOA1), cursor coordinates (CUY0_CUX0, CUY1_CUX1), a cursor layer palette (L0PAL0-L0PAL7) specifying a color, cursor layer enable (DLS), or cursor display On (CPM_CUTC) is registered. A display device 15 such as an LCD displays drawing data on a display screen along with a bitmap represented by the original cursor pattern.

FIG. 6 illustrates an exemplary register name of a display register. The display register may be included in the GDC. In a register CPM_CUTC, a bit indicating cursor display On is set. In a register CUOA0, an address of a cursor pattern with the cursor number 0 is set. In a register CUY0_CUX0, display position coordinates of a cursor with the cursor number 0 are set. In a register CUOA1, an address of a cursor pattern with the cursor number 1 is set. In a register CUY1_CUX1, display position coordinates of a cursor with the cursor number 1 are set. The coordinates of the cursors with the cursor numbers 0 and 1 are set to be arranged side by side in given positions so that one bitmap is displayed. In a register DLS, cursor layer enable is set. When a bitmap indicating that graphics software is an evaluation version is displayed, a cursor layer is enabled. In registers L0PAL0 to L0PAL7, cursor layer palette numbers 0 to 7 are set. By setting the cursor layer palette numbers 0 to 7, a display color of the cursor pattern is set.

Figure 7:
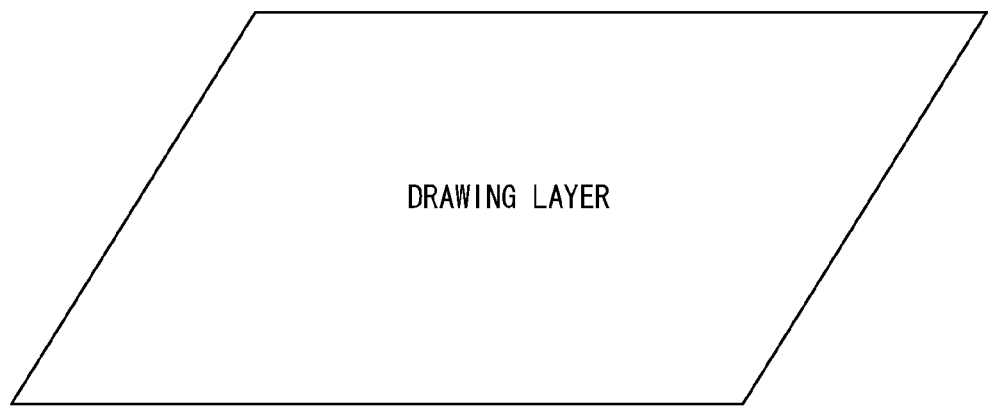
FIG. 7 illustrates an exemplary operation of hardware.
Figure 8:
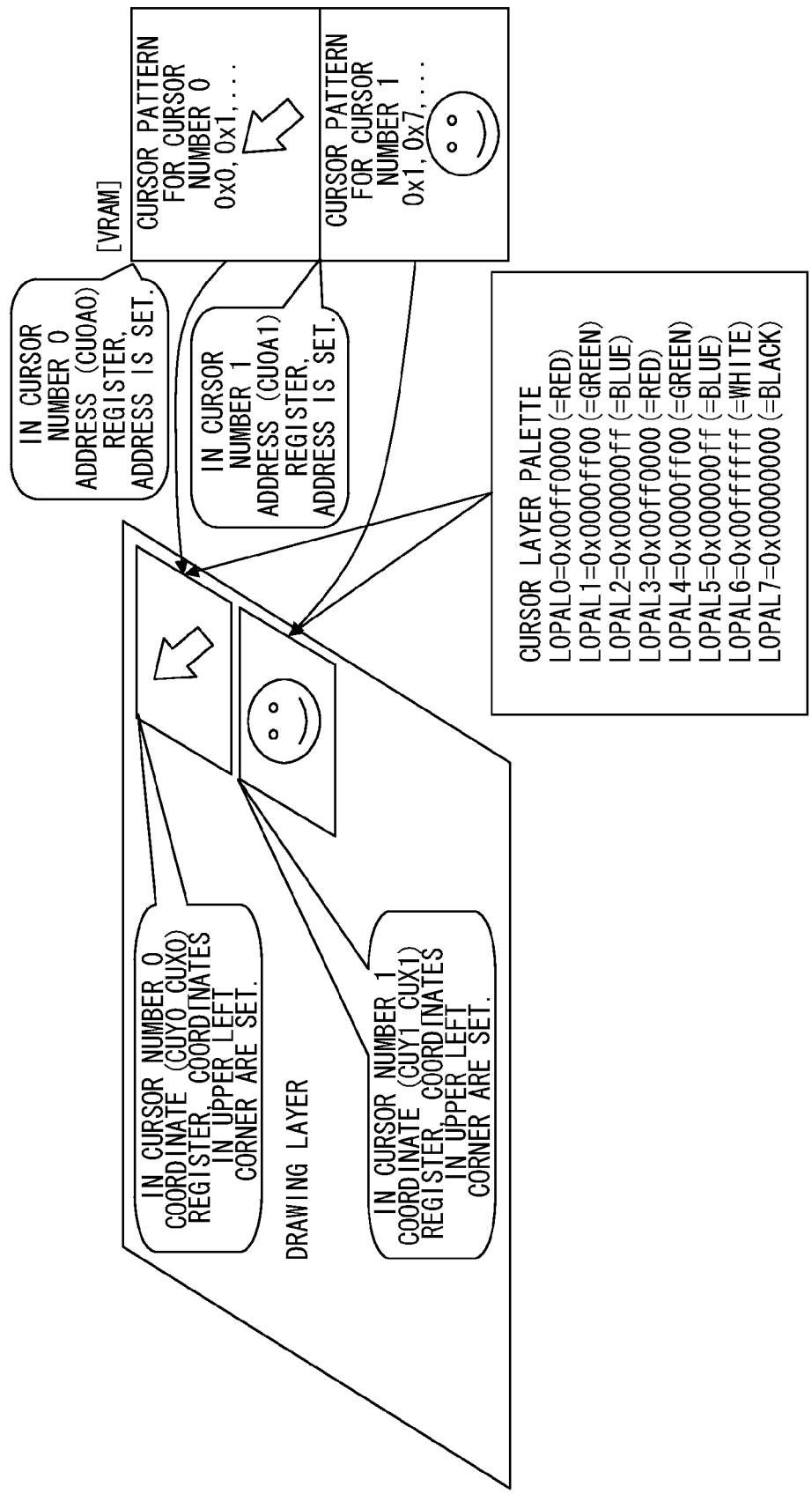
FIG. 8 illustrates an exemplary operation of hardware.

FIGS. 7 and 8 illustrate an exemplary operation of hardware. The hardware performs cursor display. The GDC displays drawing data of the drawing layer in the VRAM by a built-in display processing circuit, for example, hardware. The GDC sets appropriate values in the display register. The GDC refers to the cursor pattern placed in the VRAM and the information in the display register, and displays a cursor by a built-in processing circuit. The drawing data is expanded in the VRAM, and the GDC processes the drawing data and displays it. On the other hand, the parameters set in the display register and the bitmap stored in the VRAM are specified, and the hardware of the GDC displays a cursor.

In the cursor number 0 coordinate register of the display register, coordinates in the upper left corner of a cursor with the cursor number 0 are set; in the cursor number 1 coordinate register of the display register, coordinates in the upper left corner of a cursor with the cursor number 1 are set. In the cursor number 0 address register of the display register, an address of a cursor pattern for the cursor number 0, the cursor pattern stored in the VRAM, is set. In the cursor number 1 address register of the display register, an address of a cursor pattern for the cursor number 1 stored in the VRAM is set. In the cursor layer palette, a color of a cursor pattern is set. As an example of the cursor layer palette, a color specified by 0x00RRGGBB, wherein RR=RED, GG=GREEN, and BB=BLUE, is set in the registers L0PAL0 to L0PAL7 in which the cursor layer palette is set. In FIG. 8, in the register L0PAL0, 0x00ff0000 (red) is set; in the register L0PAL1, 0x0000ff00 (green) is set; in the register L0PAL2, 0x000000ff (blue) is set; in the register L0PAL3, 0x00ff0000 (red) is set; in the register L0PAL4, 0x0000ff00 (green) is set; in the register L0PAL5, 0x000000ff (blue) is set; in the register L0PAL6, 0x00ffffff (white) is set; and in the register L0PAL7, 0x00000000 (black) is set.

Figure 9:
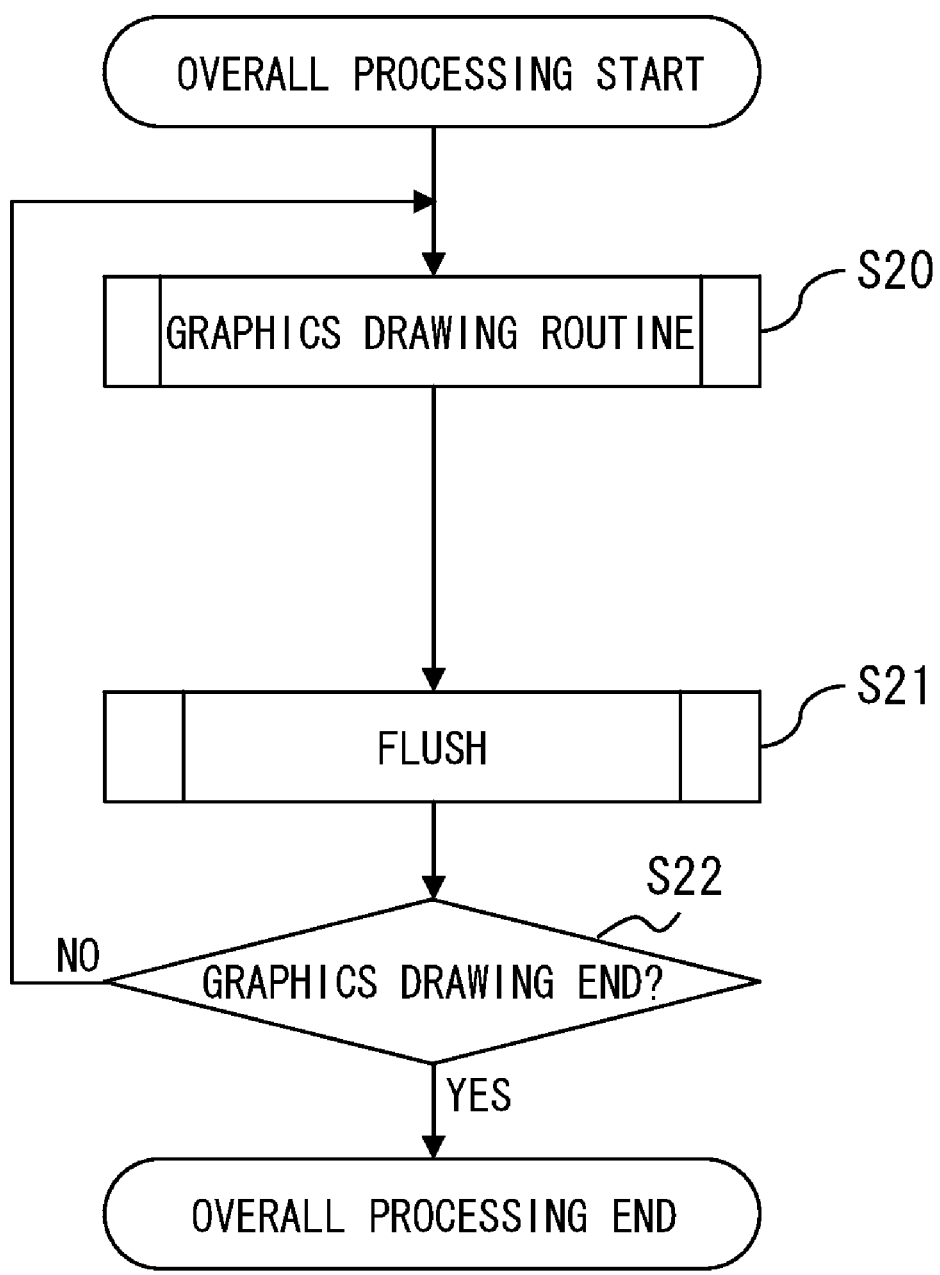
FIG. 9 illustrates an exemplary overall processing.

FIG. 9 illustrates an exemplary overall processing. When overall processing is started, in operation S20, a graphics drawing routine is started. In the graphics drawing routine, a draw command for drawing a graphic to be displayed on the screen is generated. In operation S21, the drawing flush function is executed. As a result of execution of the drawing flush function, the draw command generated in operation S20 is executed, whereby a graphic is drawn. In operation S22, whether graphics drawing is ended or not is judged. If No is selected in operation S22, the procedure goes back to operation S20, and drawing of a graphic is continued. If Yes is selected in operation S22, the overall processing is ended. For example, drawing of a bitmap may be performed in the execution of the drawing flush function.

Figure 10:
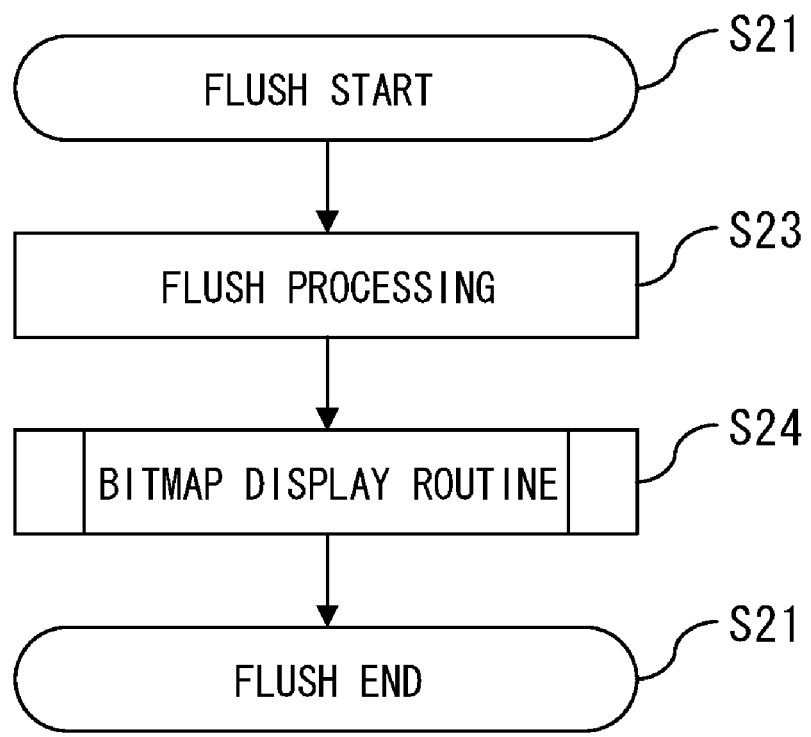
FIG. 10 illustrates an exemplary drawing flush processing.

FIG. 10 illustrates an exemplary drawing flush processing. In operation S21, the flush start is executed. In operation S23, the drawing flush function is performed, whereby a graphic is drawn. In operation S24, a bitmap display routine is executed. Since the drawing flush function is executed for drawing a graphic, by incorporating the bitmap display routine into the drawing flush function, a bitmap is displayed when graphics drawing is performed.

Figure 11:
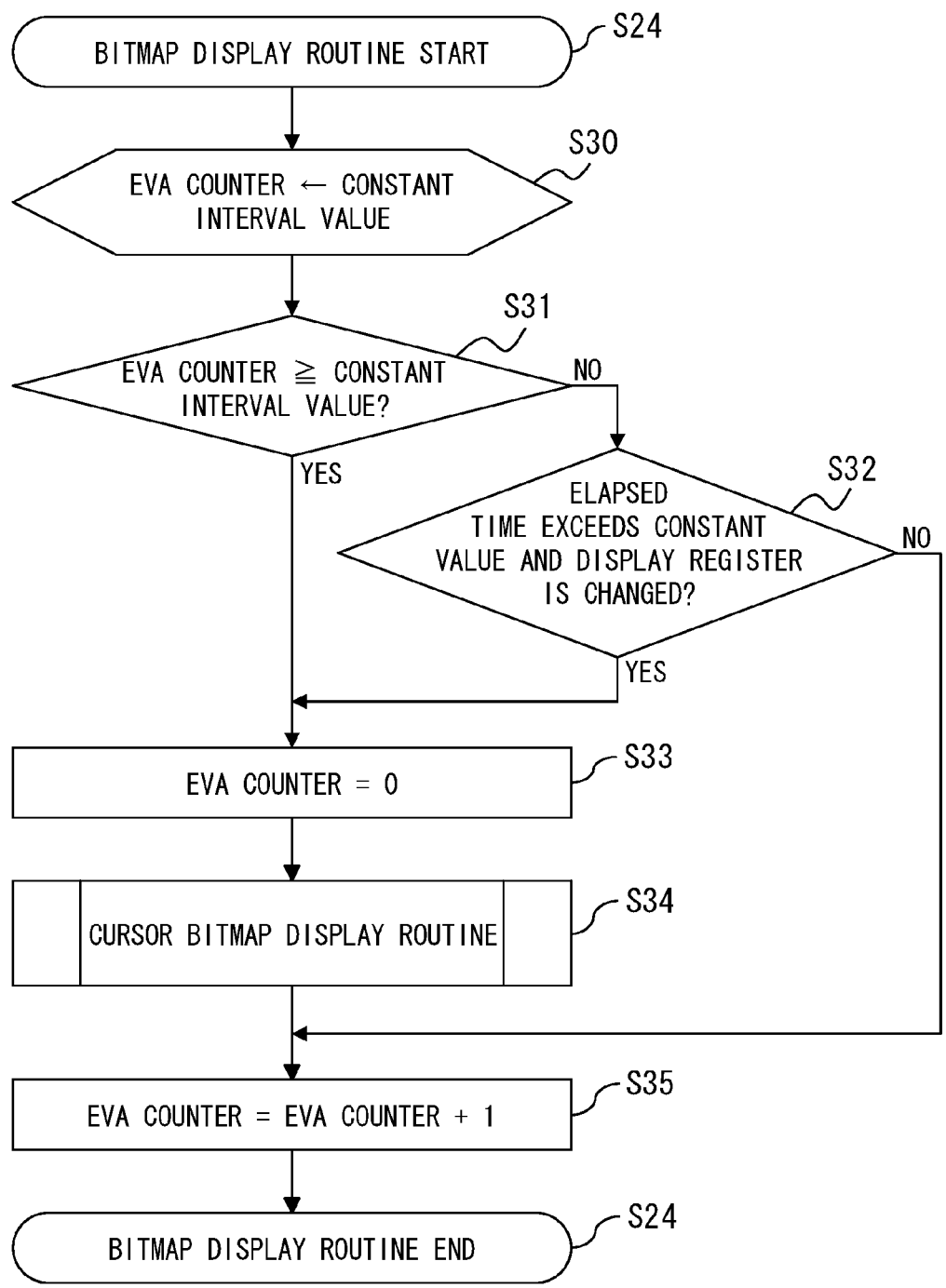
FIG. 11 illustrates an exemplary bitmap display processing.

FIG. 11 illustrates an exemplary bitmap display processing. In operation S24, a bitmap display routine start is executed. In operation S30, an interval value indicating a given interval is set in an EVA counter. The interval value is set when the bitmap display routine is first called, and may be any value. The EVA counter is incremented every time the bitmap display routine is called. The bitmap display routine is called at a given interval, and the bitmap display routine displays a bitmap newly displayed by a cursor pattern. As a result of a bitmap indicating that graphics software is an evaluation version being displayed at a given interval, bitmap hiding processing performed by the user, for example, is disabled at a given interval. In operation S31, whether the EVA counter becomes equal to or greater than the interval value or not is judged. If Yes is selected in operation S31, the procedure proceeds to operation S33. If No is selected in operation S31, in operation S32, whether an elapsed time exceeds a given time and the value in the display register is changed or not is judged. If Yes is selected in operation S32, the procedure proceeds to operation S33; if No is selected, the procedure proceeds to operation S35. In operation S32, whether the time elapsed from the previous bitmap display by the cursor exceeds a given time or not is judged. A cursor bitmap is displayed at a given interval. The bitmap display routine is called at a given interval, and the bitmap display routine redisplays the cursor bitmap. However, if a given interval is known, bitmap hiding processing may be performed at a given interval to prevent the bitmap from being displayed. To ensure that the bitmap hiding processing is disabled, a clock incorporated into the system is used so that the cursor bitmap is redisplayed when a given time has elapsed. To detect whether a change is made to prevent display of the cursor bitmap or not, whether the value in the display register is changed or not is changed. In operation S33, the EVA counter is reset to 0, and, in operation S34, the cursor bitmap display routine is executed. In operation S35, the EVA counter is incremented by 1, and the bitmap display routine is ended.

Figure 12:
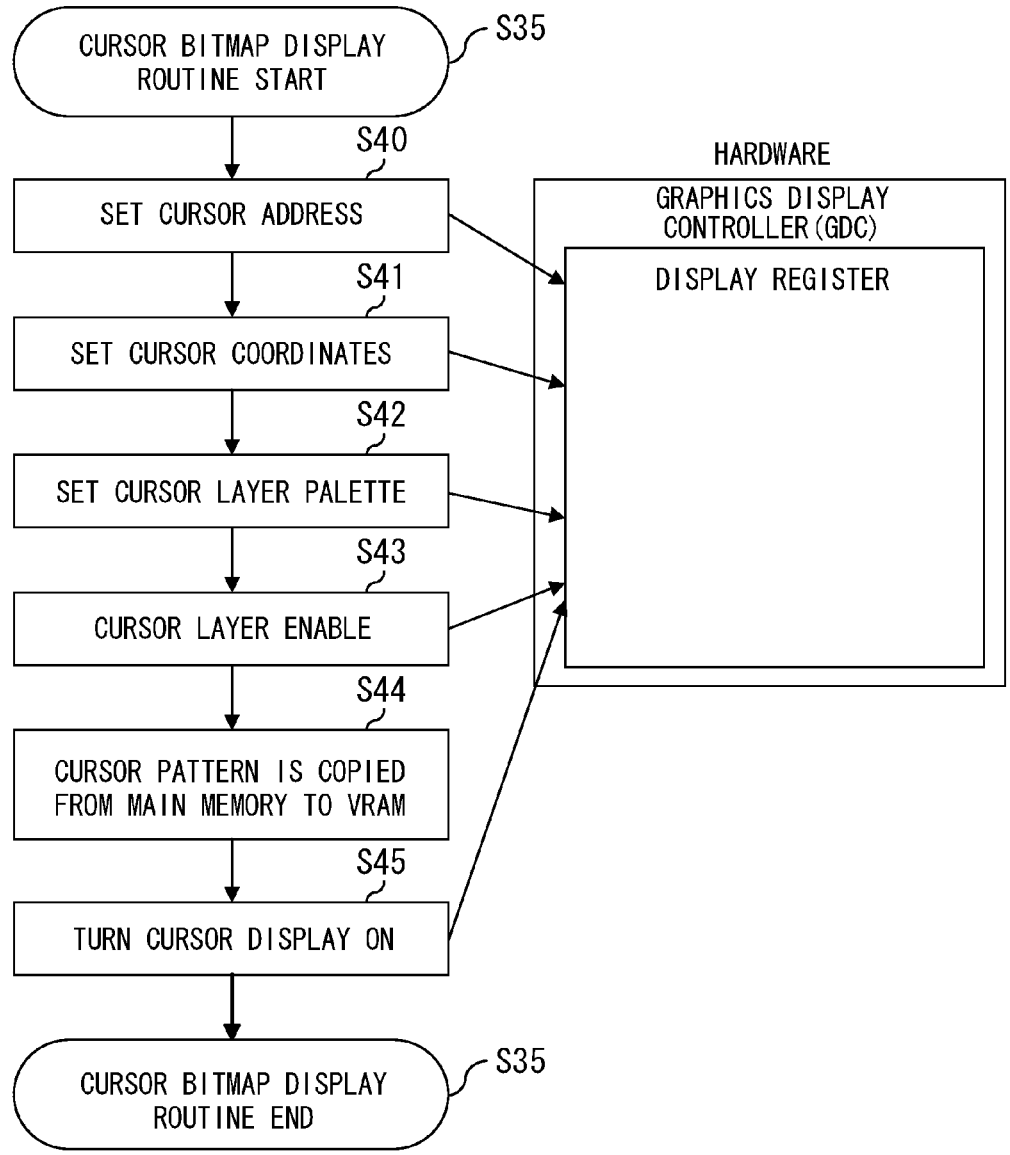
FIG. 12 illustrates an exemplary cursor bitmap display processing.

FIG. 12 illustrates an exemplary cursor bitmap display processing. In operation S35, the cursor bitmap display routine starts. In operation S40, a cursor address is set in the display register, and, in operation S41, cursor coordinates are set in the display register. In operation S42, a cursor layer palette is set in the display register, and, in operation S43, cursor layer enable is set. In operation S44, a cursor pattern is copied from the main memory to the VRAM, and, in operation S45, cursor display is turned On. Display of a cursor is performed by hardware of the GDC. When the values are set in the display register and the cursor pattern is copied to the VRAM, the hardware, for example, automatically reads these information, and performs cursor display. Operations S40 to S45 may be performed in any order.

Since display of a cursor bitmap is performed in a drawing flush function calling routine, the cursor bitmap is displayed when a graphic is displayed.

Figure 13A:
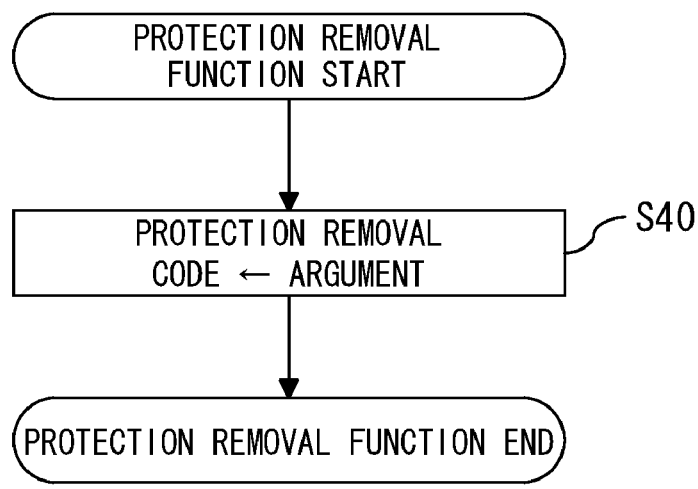
FIGS. 13A and 13B illustrate an exemplary bitmap display function deactivation processing.
Figure 13B:
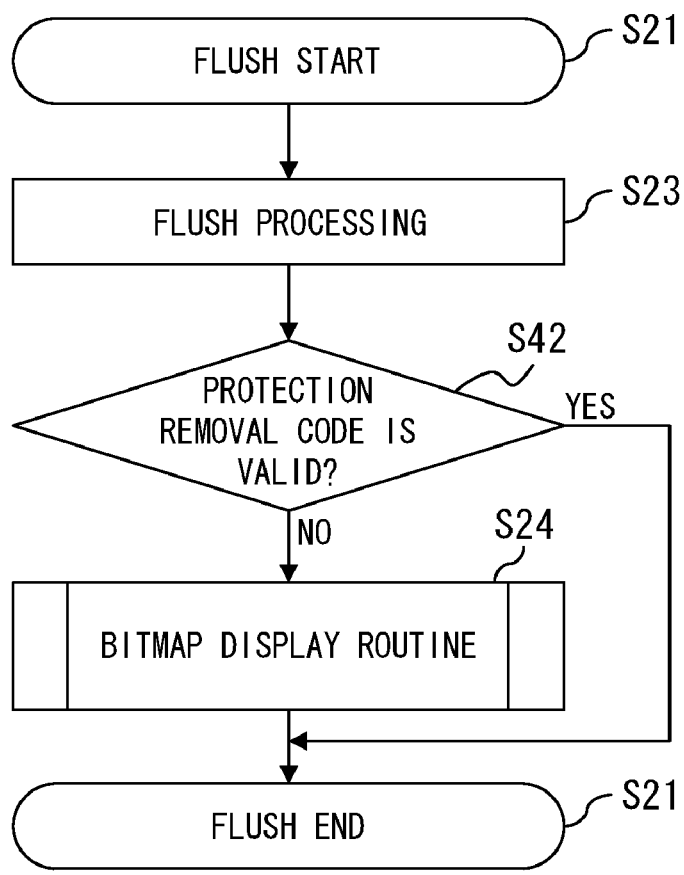

FIG. 13 illustrates an exemplary bitmap display function deactivation processing. For example, a protection removal function may deactivate the bitmap display function. As illustrated in FIG. 13A, a previously determined code is designated as an argument of the protection removal function, the protection removal function is called. In operation S40, an argument is set as a protection removal code. As illustrated in FIG. 13B, operation S42 is added to the drawing flush function. In operation S42, whether the protection removal code set by the protection removal function is valid or not is judged. If No is selected in operation S42, a bitmap display routine is called, and a cursor bitmap is displayed. If Yes is selected in operation S42, the drawing flush function is ended without displaying a cursor bitmap. Graphics software where a bitmap is displayed may be provided as an evaluation version, and, as a result of bitmap display being lifted after the purchase of a product, the graphics software may be treated as authorized graphics software.

Figure 14:
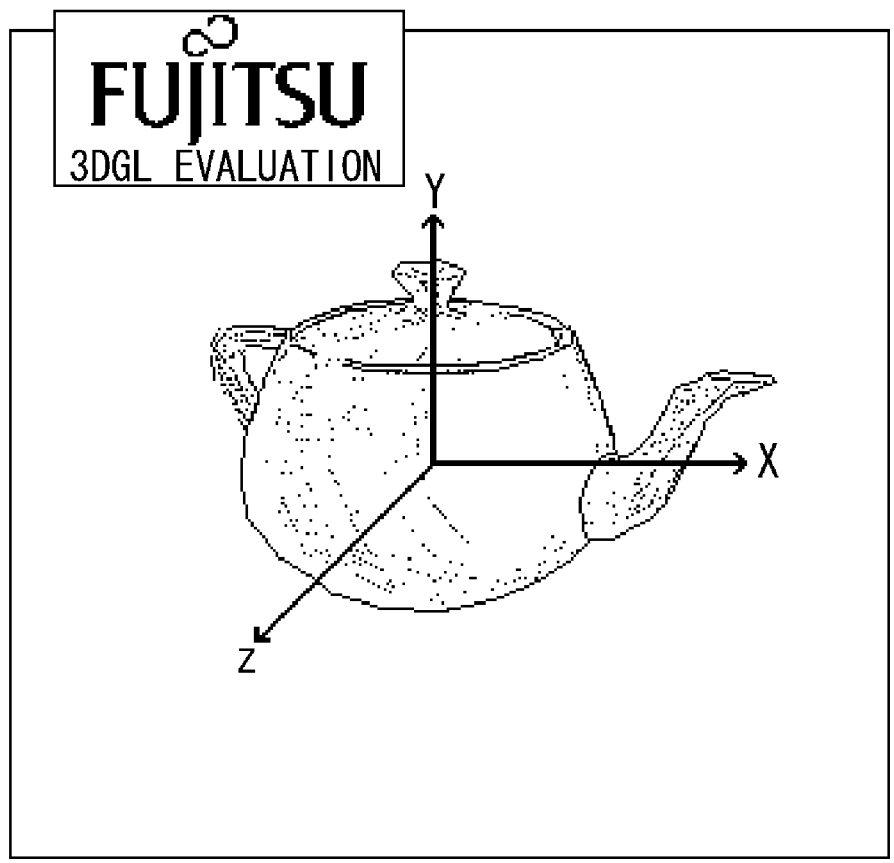
FIG. 14 illustrates an exemplary display of graphics software.

FIG. 14 illustrates an exemplary display of graphics software according to an embodiment. The previous embodiment may be applied to the graphics software. In the upper left portion of the screen on which a tea pot is displayed, a bitmap indicating that graphics software used is an evaluation version is displayed. The bitmap is displayed by hardware in the process of drawing the tea pot. Since display is performed by hardware, drawing processing by software may not be slowed down. Since the bitmap is displayed in the process of drawing the tea pot, the bitmap is displayed when a graphic such as a tea pot is drawn. Since the bitmap is displayed at a given interval and every given time, bitmap hiding processing is disabled. Since the bitmap is displayed by hardware and drawing data including a tea pot image or the like is not changed, assessment of drawing picture may be performed easily. While a specific location and type of an indication is illustrated in FIG. 14, the present invention is not limited to any particular type or location for the indication. Further, while a bitmap is illustrated for displaying an indication that the software is an evaluation version, the present invention is not limited to marking or displaying the indicator in any particular format.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Example embodiments of the present invention have now been described in accordance with the above advantages. It will be appreciated that these examples are merely illustrative of the invention. Many variations and modifications will be apparent to those skilled in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A graphics display device performing display indicating that graphics software for graphics drawing is an evaluation version, the device comprising:
    a storage circuit that stores a display pattern indicating that the graphics software is an evaluation version;
    a display register that stores a parameter indicating a display method of the display pattern; and
    a display circuit that displays the display pattern based on the parameter by a cursor display hardware.

2. The graphics display device according to claim 1, wherein the display circuit performs display of the display pattern in a graphics drawing process.

3. The graphics display device according to claim 2, wherein the display circuit displays the display pattern when the graphics drawing process is called.

4. The graphics display device according to claim 3, wherein the display circuit displays the display pattern when a given time elapses.

5. The graphics display device according to claim 1, wherein, when a given code is set in the display circuit, display of the display pattern is stopped.

6. The graphics display device according to claim 1, wherein the display register stores at least one of an address of the display pattern in the storage circuit, display position coordinates of the display pattern, and a parameter for setting a color of the display pattern.

7. The graphics display device according to claim 1, wherein the hardware displays a cursor by setting the parameter in the display register.

8. The graphics display device according to claim 1, wherein a routine displaying the display pattern is controlled by the display circuit different from a CPU.

9. A graphics display method performing display indicating that graphics software for graphics drawing is an evaluation version, the method comprising:
    storing a display pattern indicating that the graphics software is an evaluation version;
    storing a parameter indicating a display method of the display pattern; and
    displaying the display pattern based on the parameter by a cursor display hardware.

10. The graphics display method according to claim 9, wherein the displaying of the display pattern is performed in a graphics drawing process.

11. The graphics display method according to claim 9, wherein the display pattern is displayed when the graphics drawing process is called.

12. The graphics display method according to claim 9, wherein the display pattern is displayed when a predetermined time elapses.

13. The graphics display method according to claim 9, wherein the displaying of the display pattern is stopped by setting a given code.

14. A computer-implemented graphics display method, comprising:
    storing a pattern defining software as an evaluation version; and
    controlling, using a computing device, a display of graphics to include the pattern with an indication of the evaluation version in a layer independent of a drawing layer of the graphics.

* * * * *